UNITED STATES PATENT OFFICE 2,368,844

DYESTUFFS OF THE STILBENE SERIES AND A PROCESS OF MAKING SAME

Ernst Keller and Reinhard Zweidler, Basel, Switzerland, assignors to the firm J. R. Geigy A. G., Basel, Switzerland No Drawing. Application February 15, 1944, Serial No. 522,500. In Switzerland February 10, 1943

11 Claims. (Cl. 260—143)

We have found that new dyestuffs of the stilbene series are obtained by converting condensation products of cyanuric halides, in which a halogen atom of the cyanuric halide is replaced by the radical of the 4-nitro-4'-aminostilbene-2:2'-disulfonic acid and in which the remaining halogen atoms of the cyanuric nucleus may be exchanged completely or partly by inorganic or organic radicals, especially by radicals of amines, which may also contain azo groups, by way of reduction into azo or azoxy compounds. The conversion of the 4-positioned nitro group into an azo or azoxy group respectively is carried out in a known manner by reduction in an alkaline solution for instance by means of glucose, sodium sulfide and the like. The dyestuffs thus obtained may still be after-treated with oxidation agents, as this is known for stilbene dyestuffs.

The condensation products with cyanuric halide coming into question correspond to the following general formula:

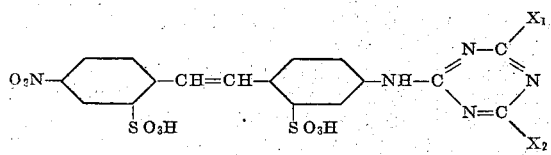

In this formula $X_1$ and $X_2$ mean the same or different organic or polyatomic inorganic radicals.

As radicals $X_1$ and $X_2$ which stand in the place of two halogen atoms of the cyanuric ring there may be mentioned the following which may be subdivided into groups in accordance with their properties:

(a) Radicals capable of forming azo dyestuffs directly or after their corresponding conversion, i. e. radicals containing diazotisable amino groups or substituents allowing the coupling with suitable diazo components. Substituents enabling the formation of azo dyestuffs are for instance: aromatically bound amino groups of the general formula —$NR_1R_2$, $R_1$ and $R_2$ being hydrogen, alkyl, aryl, etc., also —NH.acyl groups which must be saponified for the diazotisation, aromatically bound hydroxyl groups, radicals with the reactive methylene group and the like. As known, the position of the reactive substituents in the aromatic nuclei is decisive for the capability of coupling with diazo compounds. Beside this specific substitution of the radicals $X_1$ and $X_2$ also unspecific substituents come into question, as far as they do not prevent the formation of azo dyestuffs. As examples may be mentioned alkyl, acylamino, carboxyl, sulfonic acid groups and so on.

(b) Suitable organic radicals without diazotisable substituents or without substituents enabling the azo coupling or being convertible into the same, such as for instance radicals with the substituents —$NR_1R_2$ ($R_1$ meaning hydrogen or like $R_2$ alkyl, aralkyl, aryl, acyl groups, radicals of heterocyclic ring systems etc.), —OR (R representing hydrogen, alkyl, aralkyl, aryl groups and the like),

—COOH, —$SO_3H$ and so forth. In this case it is, of course, necessary that substituents of both the first mentioned kinds, which in themselves could enable the coupling with diazo components, stand in such positions which prevent such a coupling.

(c) Radicals of amino azo dyestuffs which possibly may contain metallisable atom groupings.

(d) Inorganic radicals, like —$NH_2$, —OH, the hydroxyl group being introduced by hydrolytic exchange of a halogen atom of the cyanuric halide compound.

If $X_1$ and $X_2$ belong to the group $a$, the azo dyestuff formation becoming thus possible can take place before or after the reductive conversion of the nitrostilbene cyanuric condensation products into the azo or azoxy compounds respectively; the subsequent (external) formation of the azo dyestuff can, of course, also be carried out on the fibre.

The dyestuffs obtainable according to the present invention can directly be applied to cellulosic fibres and show a very good affinity to these fibres. According to the selection of the components used for their synthesis they can, beside the possibilities already illustrated above, still be after-treated in various ways in substance or on the fibre; thus, especially the treatment with metal yielding agents, like copper, chromium salts etc., may be mentioned. Moreover, it may be pointed out that surprisingly the dyeings made by means of the dyestuffs obtainable according to the present invention are generally substantially improved with regard to their water- and washing-fastness properties, when the same are after-treated with formaldehyde.

The present invention will now be illustrated by the following examples, wherein the parts are by weight. Of course, the invention is not to be limited to the following examples.

Example 1

18.5 parts of cyanuric chloride are condensed at 0° C. and in a neutral medium in form of a fine suspension with 40 parts of 4-nitro-4'-aminostilbene-2:2'-disulfonic acid. The primary condensation product is converted in the known manner by means of 30.6 parts of 1-amino-4-hydroxybenzene-3-carboxylic acid into the tertiary condensation product and isolated, as soon as the reaction is complete. The tertiary condensation product is then dissolved in 1200 parts of water and 140 parts of caustic soda lye at 36° Bé. at 60–70° C., whereupon 180 parts of a grape-sugar solution of 10 per cent strength are allowed to flow thereinto. Then this mixture is maintained for 2–3 hours at 60–70° C., the base is neutralised by means of hydrochloric acid, precipitated with sodium chloride and finally isolated.

After having been dried, the dyestuff constitutes a brown-orange powder, which dissolves in water with a yellow-orange coloration and dyes cellulosic fibres in light-fast orange shades. By an after-treatment with chromium salts brownish-orange shades of considerably improved water- and washing-fastness properties are obtained. By a simultaneous after-treatment with copper and chromium salts the fastness properties to water, to washing and to light are increased.

If the primary condensation product is reduced in the usual manner, a dyestuff is obtained which dyes cellulosic fibres in yellow-orange shades and whose water- and washing-fastness properties are improved by a treatment with formaldehyde.

Example 2

The condensation product from 18.5 parts of cyanuric chloride, 40 parts of 4-nitro-4'-aminostilbene-2:2'-disulfonic acid, 32 parts of dehydrothio-p-toluidine sulfonic acid and 17.3 parts of metanilic acid is dissolved in 1500 parts of water and 100 parts of caustic soda lye of 36° Bé. at 60–70° C. Then a solution of 18 parts of glucose in 200 parts of water are allowed to flow thereinto, whereupon the mixture is maintained for 2 hours at 60–70° C. Finally, the base is neutralised by means of hydrochloric acid, completely precipitated with sodium chloride and isolated.

When dried, the dyestuff constitutes a brown-orange powder, which dissolves in water with a yellow-orange coloration and dyes cellulosic fibres in light-fast, clear, reddish-yellow shades. By an after-treatment with formaldehyde the dyeings become considerably improved with respect to their water- and washing-fastness properties.

For the reduction it is also possible to use e. g. sodium sulfide instead of grape sugar.

Example 3

95 parts of the condensation product from 1 mol. of cyanuric chloride, 1 mol. of 4-nitro-4'-aminostilbene-2:2'-disulfonic acid, 1 mol. of 1-amino-4-hydroxybenzene-3-carboxylic acid and 1 mol. of dehydrothio-p-toluidine sulfonic acid are dissolved in 1200 parts of water and 100 parts of caustic soda lye of 36° Bé. at 70° C., whereupon 17 parts of glucose in 200 parts of water are allowed to flow thereinto. Then this mixture is maintained for 2 hours at 70° C., the base is neutralised by means of hydrochloric acid, the dyestuff completely precipitated with sodium chloride and finally isolated.

The dried dyestuff constitutes a brown-orange powder, which dissolves in water with a yellow-orange coloration and dyes cellulosic fibres in yellowish-orange shades. By an after-treatment with chromium or copper salts the water- and washing-fastness properties are increased.

Example 4

The condensation product from 18.5 parts of cyanuric chloride, 40 parts of 4-nitro-4'-aminostilbene-2:2'-disulfonic acid, 27 parts of 5-amino-2-(4'-hydroxy-3'-carboxyphenyl)-1:3-benztriazol and aniline is dissolved in 1200 parts of water and 100 parts of caustic soda lye of 36° Bé. at 60–70° C. Then 160 parts of a 10% grape-sugar solution are allowed to flow thereinto and the mixture is maintained for 3 hours at 60–70° C., whereupon the dyestuff is isolated in the usual manner.

The dyestuff constitutes, after having been dried, a brown-orange powder, which dissolves in water with a yellow-orange coloration and dyes cellulosic fibres in light-fast reddish-yellow shades. By an after-treatment of the dyeings with chromium or copper salts the fastness properties to water and to washing are increased.

Example 5

The condensation product from 18.5 parts of cyanuric chloride, 40 parts of 4-nitro-4'-aminostilbene-2:2'-disulfonic acid and 30 parts of 1-amino-4-acetaminobenzene is treated at 60–70° C. in 1800 parts of water and 100 parts of caustic soda lye of 36° Bé. with 160 parts of a 10% grape-sugar solution. The mixture is kept for 3–4 hours at 60–70° C., then the dyestuff is separated in the usual manner by means of sodium chloride, isolated and, in order to saponify the acetyl group, heated for instance for 1 hour with 1200 parts of water and 150 parts of caustic soda lye of 36° Bé. to 95–100° C. Then the base is neutralised with hydrochloric acid, the dyestuff is completely precipitated with sodium chloride and filtered.

The dried dyestuff constitutes a brown-orange powder dissolving in water with a yellow-orange coloration and dyeing cellulosic fibres in orange shades. The dyeings diazotised on the fibre and developed with 1-phenyl-3-methyl-5-pyrazolone yield beautiful orange shades of a good water- and washing-fastness.

If after its reduction the above described dyestuff is still treated in the known manner with a sodium hypochlorite solution and subsequently saponified, a product is obtained yielding somewhat clearer dyeings.

Example 6

64.5 parts of the condensation product from 1 mol. of cyanuric chloride, 1 mol. of 4-nitro-4'-aminostilbene-2:2'-disulfonic acid, 1 mol. of 1-amino-4-hydroxy-benzene-3-carboxylic acid and ammonia are dissolved in 1000 parts of water and 100 parts of caustic soda lye of 36° Bé. Then 180 parts of a 10% grape-sugar solution are allowed to flow thereinto at 60–70° C., whereupon the mixture is worked up in the usual manner.

The dried dyestuff forms a brown-orange powder, which dissolves in water with a yellow-orange coloration and dyes cellulosic fibres in yellowish-orange shades, the water- and washing-fastness properties of which can considerably be increased by an after-treatment with metal salts.

The reduction can also be effected by using sodium sulfide, e. g. at 35° C. with a solution containing 30 parts of crystallised sodium sulfide.

Example 7

The condensation product from 18.5 parts of cyanuric chloride, 40 parts of 4-nitro-4'-aminostilbene-2:2'-disulfonic acid and 54.2 parts of o-toluidine-methylene-o-cresotinic acid are dissolved in 1500 parts of water and 100 parts of caustic soda lye of 36° Bé., treated with 160 parts of a 10% grape-sugar solution at 60–70° C., then the mixture is maintained for 3 hours at this temperature and the interaction product separated in the usual manner is filtered off.

The dyestuff constitutes, when dried, a yellow-orange powder dissolving in water with a yellow coloration and dyeing cellulosic fibres in yellow shades, which, when after-treated with chromium salts, possess very good fastness properties to water and to washing.

Example 8

The condensation product from 18.5 parts of cyanuric chloride, 40 parts of 4-nitro-4'-aminostilbene-2:2'-disulfonic acid, 32 parts of dehydrothio-p-toluidine sulfonic acid and 14.3 parts of 4-chloro-1:3-diaminobenzene is dissolved in 2000 parts of water and 100 parts of caustic soda lye of 36° Bé. at 60–70° C., then 150 parts of a 10% glucose solution are allowed to flow thereinto and the whole is maintained for 3 hours at 60–70° C.; finally, the dyestuff is separated in the usual manner and isolated.

The reddish-brown dyestuff dissolves in water with an orange-coloration and dyes cellulosic fibres in reddish-yellow shades, which, when developed with 1-phenyl-3-methyl-5-pyrazolone, give clear, yellowish-orange shades of good water- and washing-fastness properties.

The above reduction product can also be diazotised in substance and coupled for instance with 1-phenyl-3-methyl-5-pyrazolone or its substitution products. When working in this manner, yellow-orange dyestuffs are obtained which, when after-treated with formaldehyde, yield on cellulosic fibres dyeings which are distinguished by good water- and washing-fastness properties.

Finally, it is also possible to obtain dyestuffs having the same properties by first diazotising the condensation product described in this example, then coupling with pyrazolone derivatives and reducing the coupling products.

Example 9

82.5 parts of the condensation product from 1 mol. of cyanuric chloride, 1 mol. of 4-nitro-4'-aminostilbene-2:2'-disulfonic acid, 1 mol. of 4-amino-4'-hydroxy-3'-carboxy-1:1'-azobenzene and aniline are dissolved in 1600 parts of water and 100 parts of caustic soda lye of 36° Bé. Then 170 parts of a 10% glucose solution are allowed to flow thereinto and the mixture is maintained for 2–3 hours at 60–70° C., whereupon the dyestuff is separated in the usual manner and isolated.

The dried dyestuff constitutes a brown-orange powder dyeing cellulosic fibres in yellow shades which with respect to their water- and washing-fastness properties become considerably improved by an after-treatment with metal salts or formaldehyde.

Further similar dyestuffs are obtained, if in this example the aniline is replaced by monomethyl aniline, monoethyl aniline, metanilic acid, m-aminobenzoic acid and the like.

Example 10

78 parts of the condensation product from 1 mol. of cyanuric chloride, 1 mol. of 4-nitro-4'-aminostilbene-2:2'-disulfonic acid, 1 mol. of 4-amino-4'-hydroxy-3'-carboxy-1:1'-azobenzene and dimethyl amine are dissolved in 1200 parts of water and 100 parts of caustic soda lye of 36° Bé., then treated at 60–70° C. for 3 hours with 170 parts of a 10% glucose solution and isolated in the usual manner.

When dried, the dyestuff constitutes a brown-orange powder; it dissolves in water with an orange coloration and dyes cellulosic fibres in reddish-yellow shades, which, when after-treated with formaldehyde possess very good fastness properties to water and to washing. Likewise the water- and washing-fastness are considerably increased by an after-treatment with chromium salts, the shade becoming then somewhat greener and duller.

Example 11

105 parts of the condensation product from 1 mol. of cyanuric chloride, 1 mol. of 4-nitro-4'-aminostilbene-2:2'-disulfonic acid, 1 mol. of 4-amino-4'-hydroxy-3'-carboxy-1:1'-azobenzene and 1 mol. of dehydrothio-p-toluidine are reduced in 1200 parts of water and 100 parts of caustic soda lye of 36° Bé. at 60–70° C. for 2–3 hours by means of 170 parts of a 10% glucose solution and isolated in the usual manner.

The dyestuff is a brown powder, which dissolves in water with a yellow-orange coloration and dyes cellulosic fibres in yellow shades which, when after-treated with metal salts or formaldehyde, are distinguished by good fastness properties to washing and water.

Example 12

85 parts of the condensation product from 1 mol. of cyanuric chloride, 1 mol. of 4-nitro-4'-aminostilbene-2:2'-disulfonic acid, 1 mol. of 4-amino-azobenzene-4'-sulfonic acid and aniline are dissolved in 1200 parts of water and 180 parts of caustic soda lye of 36° Bé., then reduced within 3 hours at 60–70° C. by means of 180 parts of a 10% glucose solution and isolated in the usual manner.

The dyestuff constitutes a brown-orange powder, which dissolves in water with an orange coloration and dyes cellulosic fibres in light-fast reddish-yellow shades which, by an after-treatment with formaldehyde, are considerably improved with respect to their fastness properties to water and to washing.

When the said dyestuff is after-treated with sodium hypochlorite, a product is obtained which produces somewhat more greenish-yellow shades.

Example 13

95 parts of the condensation product obtainable from 1 mol. of cyanuric chloride, 1 mol. of 4-nitro-4'-aminostilbene-2:2'-disulfonic acid, 1 mol. of 4-amino-2-methyl-5-methoxy-1:1'-azobenzene-4'-sulfonic acid and 1 mol. of 1-amino-4-hydroxybenzene-3-carboxylic acid are reduced in the usual manner with glucose or sodium sulfide and isolated.

The dyestuff constitutes a reddish-brown powder, which dissolves in water with an orange coloration and dyes cellulosic fibres in yellow shades, whose water- and washing-fastness becomes considerably increased by an after-treatment with metal salts.

Example 14

92 parts of the condensation product from 1 mol. of cyanuric chloride, 1 mol. of 4-nitro-4'-aminostilbene-2:2'-disulfonic acid, 1 mol. of 4-amino-2-methyl-4'-h y d r o x y-3'-carboxy-1:1'-azobenzene-5'-sulfonic acid and aniline are reduced in the usual manner with glucose and isolated.

The dyestuff constitutes a brown-orange powder; it dissolves in water with a yellow coloration and dyes cellulosic fibres in good light-fast, reddish-yellow shades. By an after-treatment with chromium salts the water- and washing-fastness are improved, without notably changing the shade.

Example 15

The condensation product from 18.5 parts of cyanuric chloride, 40 parts of 4-nitro-4'-aminostilbene-2:2'-disulfonic acid, 62.1 parts of the dyestuff from diazotised p-toluene sulfo ester of the 1:3-aminonaphthol-3:6-disulfonic acid and 1-amino-2-methoxy-5-methylbenzene and aniline is dissolved in 1500 parts of water and 100 parts of caustic soda lye of 36° Bé. at 40° C.; then 160 parts of a 10% glucose solution are allowed to flow thereinto and this mixture is maintained for 2 hours at 35–40° C. For the complete saponification of the toluene sulfo ester the whole is still heated for 30 minutes up to 90–95° C.; after cooling the base is neutralised by means of hydrochloric acid, the dyestuff completely precipitated with sodium chloride and filtered off.

The reduction can also be carried out at 60–70° C., the p-toluene sulfo ester being thus simultaneously saponified. Finally, the p-toluene sulfo ester of the condensation product may first also be saponified and then reduced; in this case the saponification can be carried out in an acid or alkaline reaction medium.

The dried dyestuff constitutes a red-brown powder, which dissolves in water with a yellow-red coloration and dyes cellulosic fibres in light-fast scarlet shades.

Example 16

115 parts of the condensation product from 1 mol. of cyanuric chloride, 1 mol. of 4-nitro-4'-aminostilbene-2:2'-disulfonic acid, 1 mol. of 4-amino-2-methyl-5-methoxy-1:1'-azobenzene-4'-sulfonic acid and 1 mol. of 1-(4'-aminobenzoyl)-a m i n o-2-hydroxy-3-carboxybenzene-5-sulfonic acid are reduced in the usual manner and isolated.

When dried, the dyestuff constitutes an orange powder; it dissolves in water with a yellow coloration and dyes cellulosic fibres in yellow shades. By an after-treatment with chromium salts very good water- and washing-fastness are obtained, while scarcely changing the shades.

Example 17

92.6 parts of the condensation product from 1 mol. of cyanuric chloride, 1 mol. of 4-nitro-4'-aminostilbene-2:2'-disulfonic acid, 1 mol. of 4-amino-2-methoxy - 2'-hydroxy - 3'-chloro-1:1'-azobenzene-5'-sulfonic acid and aniline are reduced in the usual manner and isolated.

The dyestuff constitutes a brown powder, which dissolves in water with a yellow-orange coloration and dyes cellulosic fibres in yellow-orange shades which, when after-treated with copper salts, give very light-fast, reddish-brown shades of good water- and washing-fastness properties.

If the above dyestuff is converted in substance, e. g. by heating its aqueous solution for several hours with a solution of 25 parts of crystallised copper sulfate in 100 parts of water and 50 parts of concentrated ammonia, into the copper complex, there is obtained a product dyeing cellulosic fibres in very light-fast brown shades.

A similar dyestuff is obtained by replacing the above described condensation product by the condensation product from 18.5 parts of cyanuric chloride, 40 parts of 4-nitro-4'-aminostilbene-2:2-disulfonic acid and 35.8 parts of 4-amino-2-methoxy-2'-hydroxy-3'-chloro-1:1'-azobenzene-5'-sulfonic acid.

Example 18

The condensation product from 1 mol. of cyanuric chloride, 1 mol. of 4-nitro-4'-aminostilbene-2:2'-disulfonic acid, 1 mol. of 4-amino-4'-hydroxy-3'-carboxy-1:1'-azobenzene and 1 mol. of 1:3-diaminobenzene-4-sulfonic acid is reduced and worked up in the usual manner.

The dyestuff constitutes a brown powder, which dissolves in water with a yellow-orange coloration and dyes cellulosic fibres in yellow shades. By diazotisation on the fibre and development with 1-phenyl-3-methyl-5-pyrazolone reddish-yellow shades of good water- and washing-fastness properties are obtained.

Example 19

88 parts of the condensation product from 1 mol. of cyanuric chloride, 1 mol. of 4-nitro-4'-aminostilbene-2-2'-disulfonic acid, 1 mol. of 4-amino-4'-hydroxy - 3'-carboxy - 1:1'-azobenzene and 4-aminoacetanilide are reduced and worked up in the usual manner.

The brown-orange dyestuff dissolves in water with an orange coloration and dyes cellulosic fibres in yellow shades. By an after-treatment with formaldehyde good-fastness properties to water and to washing are obtained.

If the above dyestuff is heated with diluted acid or with diluted alkalis, the acetyl group is split off. The saponified dyestuff gives on cellulosic fibres after diazotisation and development with 1-phenyl-3-methyl-5-pyrazolone, yellow-orange shades of good water- and washing-fastness.

The same dyestuff is obtained, when in the above example the 4-aminoacetanilide is replaced by 4-aminoformanilide.

Example 20

The condensation product from 18.5 parts of cyanuric chloride, 40 parts of 4-nitro-4'-aminostilbene-2:2'-disulfonic acid, 25.7 parts of 4-amino-4'-hydroxy-3' - carboxy - 1:1'-azobenzene and 32.2 parts of 4-amino-2-methyl-5-methoxy-1:1'-azobenzene-4'-solfonic acid is reduced and worked up in the usual manner.

The dyestuff constitutes a red-brown powder; it dissolves in water with an orange coloration and dyes cellulosic fibres in yellow shades, which, when after-treated with formaldehyde, are distinguished by good water- and washing-fastness properties. The fastness properties to water and to washing can also be improved by an after-treatment with metal salts.

Example 21

111 parts of the condensation product from 1 mol. of cyanuric chloride, 1 mol. of 4-nitro-4'-aminostilbene-2:2'-disulfonic acid, 1 mol. of the dyestuff obtainable from diazotised 4-aminoazobenzene-4'-sulfonic acid and aminonaphthol sulfonic acid-2:5:7 and monomethyl aniline are dissolved in 1600 parts of water and 100 parts of caustic soda lye of 36° Bé; then 170 parts of a 10% glucose solution are allowed to flow thereinto at 35-40° C. and the whole is maintained at this temperature for 2-3 hours. The dyestuff thus formed is worked up in the usual manner.

The dyestuff constitutes a violet-brown powder, dissolving in water with a red coloration and dyeing cellulosic fibres in good light-fast red shades, whose fastness properties to water and to washing can be improved by an after-treatment with formaldehyde.

Instead of monomethyl aniline, monoethyl aniline may be used with the same result.

Example 22

The condensation product from 18.5 parts of cyanuric chloride, 40 parts of 4-nitro-4'-amino-stilbene-2:2'-disulfonic acid, 23.9 parts of aminonaphthol sulfonic acid-2:5:7 and 15.3 parts of 1-amino-4-hydroxybenzene-3-carboxylic acid is coupled in a soda alkaline solution with diazotised 4-amino azobenzene. The isolated coupling product is reduced in 2000 parts of water and 100 parts of caustic soda lye with 170 parts of a 10% glucose solution at 60° C. and within 2-3 hours and then worked up in the usual manner.

The dyestuff constitutes a violet-brown powder, which dissolves in water with a red coloration and dyes cellulosic fibres in red shades, whose water- and washing-fastness can be improved by an after-treatment with formaldehyde. By an after-treatment with potassium chromate one obtains somewhat duller reddish shades having also improved fastness properties to water and to washing.

Example 23

The condensation product from 18.5 parts of cyanuric chloride, 40 parts of 4-nitro-4'-amino-stilbene-2:2'-disulfonic acid and 35.8 parts of 2-(3'-aminobenzoyl)-amino-5-hydroxynaphthalene-7-sulfonic acid is reduced in the usual manner and the dyestuff isolated.

The dyestuff being soluble in water with a yellow-orange coloration dyes cellulosic fibres in reddish-yellow shades which, when treated with p-nitrodiazobenzene, produce bright orange shades of good water- and washing-fastness properties.

If the above dyestuff is coupled in an alkaline medium with diazotised anthranilic acid, a product is obtained which dyes cellulosic fibres in orange shades. By an after-treatment of these dyeings with copper salts beautiful brown shades of good fastness properties to light, to water and to washing are obtained.

A similar dyestuff is obtained by replacing the 2-(3'-aminobenzoyl)-amino-5-hydroxynaphthalene-7-sulfonic acid by the 2-amino-5-hydroxy naphthalene-7-sulfonic acid.

In the following table further dyestuffs obtainable according to this invention are enumerated. In order to simplify the table only the components $X_1$ and $X_2$ of the dyestuffs having the general formula

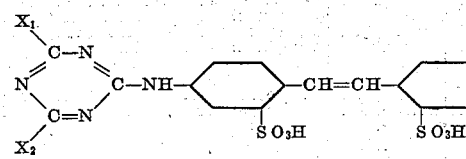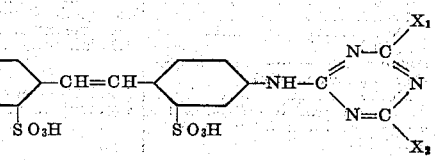

wherein Z means an azo or azoxy bridge, are indicated.

Table

| $X_1$ | $X_2$ | Dyeing on cellulosic fibres | Method of after-treatment Me=metal salts F=formaldehyde |
|---|---|---|---|
| 1-amino-4-hydroxybenzene-3-carboxylic acid | Monomethylamine | Yellow-orange | F, Me |
| Do | Diethylamine | do | F, Me |
| Do | Aniline | do | F, Me |
| Do | Monomethylaniline | do | F, Me |
| 1-amino-4-hydroxy-3-methylbenzene-5-carboxylic acid | Aniline | do | F, Me |
| Do | Saponified | do | F, Me |
| Dehydrothio-p-toluidine sulfonic acid | 1-amino-4-hydroxy-3-carboxybenzene-5-sulfonic acid | do | F, Me |
| 1-amino-4-hydroxy-3-carboxybenzene-5-sulfonic acid | Aniline | do | F, Me |
| 1-(3'-aminobenzoyl)-amino-4-hydroxybenzene-3-carboxylic acid | do | do | F, Me |
| 5-amino-2-(4'-hydroxy-3'-carboxy-5'-sulfophenyl)-1:3-benztriazol | do | do | F, Me |
| Do | 1-amino-4-hydroxybenzene-3-carboxylic acid | do | F, Me |
| 2-(4-aminophenyl)-(naphtho-1':2':4:5-triazol)-5':7'-disulfonic acid | Aniline | do | F |
| Do | Dimethylamine | do | F |
| 4-amino-5-methoxy-2-methyl-1:1'-azobenzene-4'-sulfonic acid | Aniline | Reddish-yellow | F |
| Dehydrothio-p-toluidine sulfonic acid | 4-amino-5-methoxy-2-methyl-1:1'-azobenzene-4'-sulfonic acid | do | F |
| 4-amino-5-methoxy-2-methyl-1:1'-azobenzene-4'-sulfonic acid | 1-(3'-amino-benzoyl)-amino-4-hydroxybenzene-3-carboxylic acid | do | F, Me |
| 5-amino-2-(2'-hydroxy-3'-carboxy-5'-sulfophenyl)-1:3-benztriazol | 4-amino-5-methoxy-2-methyl-1:1'-azobenzene-4'-sulfonic acid | do | F, Me |
| Do | 4-amino-3-methoxy-1:1'-azobenzene-3'-carboxylic acid | do | F, Me |
| 4-amino-2-acetyl-amino-4'-chloro-1:1'-azobenzene-3'-sulfonic acid | Aniline | do | F |
| Dehydrothio-p-toluidine sulfonic acid | 4-amino-2-acetyl-amino-4'-chloro-1:1'-azobenzene-3'-sulfonic acid | do | F |
| 4-amino-2-acetyl-amino-4'-chloro-1:1'-azobenzene-3'-sulfonic acid | Dimethylamine | do | F |
| 3-amino-4'-hydroxy-1:1'-azobenzene-3'-carboxylic acid | Aniline | do | F, Me |
| 4-amino-4'-ω-sulfomethyl-1:1'-azobenzene | do | Yellow | F |
| Do | Dimethylamine | do | F |
| 4-amino-2-methyl-4'-ω-sulfoacetylamino-1:1'-azobenzene | Aniline | do | F |
| Do | Dimethylamine | do | F |

| $X_1$ | $X_2$ | Dyeing on cellulosic fibres | Method of after-treatment Me=metal salts F=formaldehyde |
|---|---|---|---|
| 4-amino-2:5-dimethoxy-1:1'-azobenzene-4'-sulfonic acid. | Aniline | Yellow-orange | F |
| Do | Monomethylamine | do | F |
| Do | Dimethylamine | do | F |
| Dyestuff from diazotised p-toluene sulfo ester of the 1:8-aminonaphthol-3:6-disulfonic acid and 1-amino-2-methoxy-5-methylbenzene, saponified. | Ammonia | Yellowish-red | F |
| Do | Diethylamine | do | F |
| Dyestuff from diazotised p-toluene sulfo ester of the 1:8-aminonaphthol-3:6-disulfonic acid and 1-amino-2-methoxy-5-methylbenzene. | Monomethylaniline | do | F |
| Do | 1-amino-4-hydroxybenzene-3-carboxylic acid | do | F, Me |
| Do | 1-(3'-aminobenzoyl)-amino-4-hydroxy-3-carboxybenzene-5-sulfonic acid. | do | F, Me |
| Dyestuff from diazotised p-toluene sulfo ester of the 1:8-aminonaphthol-3:6-disulfonic acid and 1-amino-2:5-dimethoxybenzene, saponified. | Aniline | Red | F |
| Do | Dimethylamine | do | F |
| Do | 1-(4'-aminobenzoyl)-amino-4-hydroxybenzene-3-carboxylic acid. | do | F, Me |

| $X_1$ | $X_2$ | | Diazotised and developed with— | Developed dyeing on cellulosic fibres |
|---|---|---|---|---|
| Dehydrothio-p-toluidine-sulfonic acid. | 3-aminoacetanilide | Saponified | 1-phenyl-3-methyl-5-pyrazolone | Orange. |
| Do | 3-aminoformanilide | do | do | Do. |
| Do | 4-aminoacetanilide | do | do | Do. |
| 4-amino-2-methyl-1:1'-azobenzene-4'-sulfonic acid. | 3-aminoacetanilide | do | do | Do. |
| 4-amino-2:2'-dimethyl-1:1'-azobenzene-4'-sulfonic acid. | do | do | do | Do. |
| p-Toluene sulfo ester of the 1:8-aminonaphthol-3:6-disulfonic acid diazotised and coupled with 1-amino-2-methoxy-5-methylbenzene. | 3-aminoformanilide | do | β-naphthol | Red. |
| Do | 4-aminoformanilide | do | 1-phenyl-3-methyl-5-pyrazolone | Yellowish-red. |
| Do | 1:3-diamino-4-chlorobenzene | do | β-naphthol | Red. |
| Do | 3-aminoformanilide | do | 1-phenyl-3-methyl-5-pyrazolone | Yellowish-red. |
| Diazotised 4-aminoazobenzene-4'-sulfonic acid → aminonaphthol-sulfonic acid 2:5:7. | 1:3-diamino-4-chlorobenzene | | β-naphthol | Blue-red. |
| Do | 1:3-diaminobenzene-4-sulfonic acid | | do | Do. |
| Diazotised 4-aminoazobenzene → aminonaphtholsulfonic acid-2:5:7. | 4-aminoformanilide | do | do | Do. |

| $X_1$ | $X_2$ | Dyeing on cellulosic fibres | Dyeing of the copper complex |
|---|---|---|---|
| 2-amino-1-hydroxybenzene-4-sulfonic acid → m-anisidine. | Aniline | Brownish-yellow | Yellow-brown. |
| Do | 1-amino-4-hydroxybenzene-3-carboxylic acid | do | Do. |
| Do | Dimethylamine | do | Do. |
| 2-amino-1-hydroxybenzene-4-sulfonic acid → 1-amino-2:5-dimethoxybenzene. | Aniline | Brown-yellow | Brown. |
| Do | Ammonia | do | Do. |
| Anthranilic acid → 2-(3'-amino-benzoyl)-amino-5-hydroxynaphthalene-7-sulfonic acid. | Aniline | Orange | Yellow-brown. |
| Do | 1-amino-2-hydroxy-3-carboxybenzene-5-sulfonic acid. | do | Do. |

The metallisable dyestuffs mentioned in the above table can, of course, also be after-treated with metal salts on the fibre.

What we claim is:

1. A process for the manufacture of dyestuffs of the stilbene series of the general formula

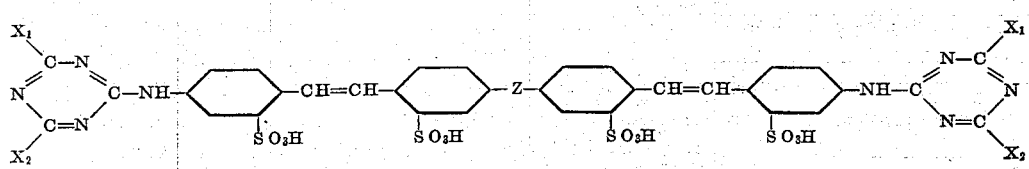

wherein $X_1$ stands for a member selected from the group consisting of radicals of aromatic amines of the benzene and naphthalene series and of heterocyclic amines of the thiazol and triazol series, $X_2$ stands for a member selected from the group consisting of hydroxy and amino groups and radicals of low molecular aliphatic amines and aromatic amines of the benzene series, the amines in both cases $X_1$ and $X_2$ being bound with the amino group to the cyanuric ring, Z stands for a member selected from the group consisting of the azo and azoxy groups, which comprises condensing one mol. of a cyanuric halide with one mol. of 4-nitro-4'-aminostilbene-2:2'-disulfonic acid, one mol. of $X_1$—H and one mol. of $X_2$—H and reducing the so-obtained condensation product in an alkaline medium with a smooth reducing agent to form the linkage Z.

2. A process for the manufacture of dyestuffs of the stilbene series of the general formula

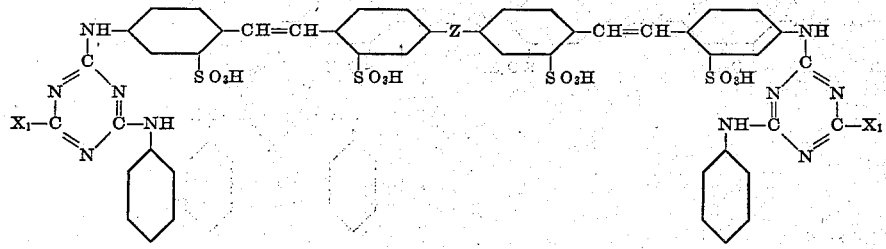

wherein $X_1$ stands for a member selected from the group consisting of radicals of aromatic amines of the benzene and naphthalene series and of heterocyclic amines of the thiazol and triazol series and Z stands for a member selected from the group consisting of the azo and azoxy groups, X, being bound with the amino group to the cyanuric ring which comprises condensing one mol. of a cyanuric halide with one mol. of 4-nitro-4'-aminostilbene-2:2'-disulfonic acid, one mol. of $X_1$—H and one mol. of aniline and reducing the so-obtained condensation product in an alkaline medium with a smooth reducing agent to form the linkage Z.

3. A process for the manufacture of dyestuffs of the stilbene series of the general formula

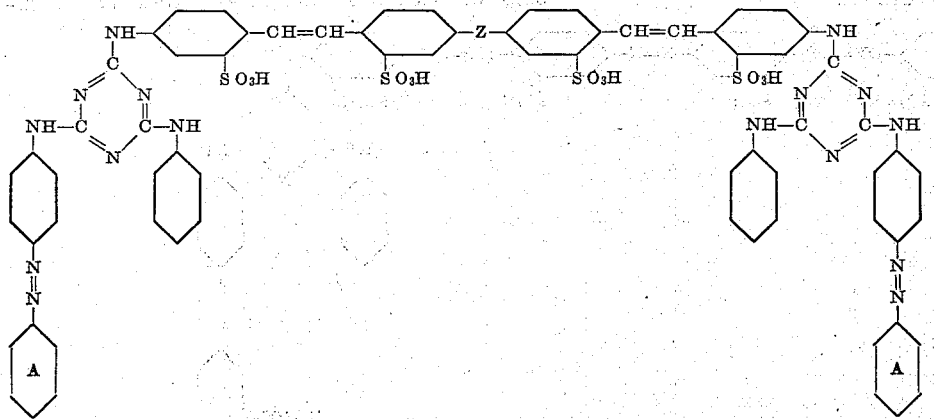

wherein Z stands for a member selected from the group consisting of the azo and azoxy groups and the benzene nuclei A containing substituents, at least one of them imparting solubility in water, which comprises condensing one mol. of cyanuric halide with one mol. of 4-nitro-4'-aminostilbene-2:2'-disulfonic acid, one mol. of a 4-amino-1:1'-azobenzene dyestuff and one mol. of aniline and reducing the so-obtained condensation product in an alkaline medium with a smooth reducing agent to form the linkage Z.

4. A process for the manufacture of dyestuffs of the stilbene series of the general formula

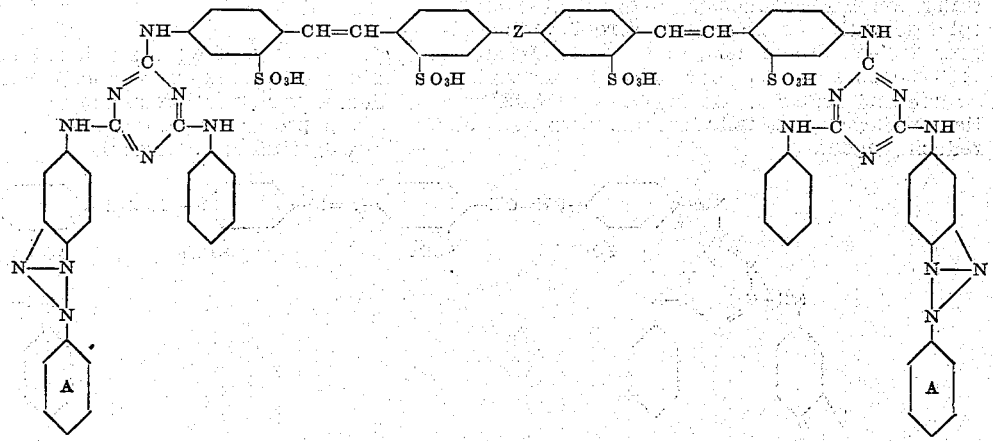

wherein Z stands for a member selected from the group consisting of the azo and azoxy groups and the benzene nuclei A containing substituents, at least one of them imparting solubility in water, which comprises condensing one mol. of cyanuric halide with one mol. of 4-nitro-4'-aminostilbene-2:2'-disulfonic acid, one mol. of a 5-amino-2-phenyl-1:3-benztriazol derivative and one mol. of aniline and reducing the so-obtained condensation product in an alkaline medium with a smooth reducing agent to form the linkage Z.

5. A process for the manufacture of the stilbene dyestuff of the formula

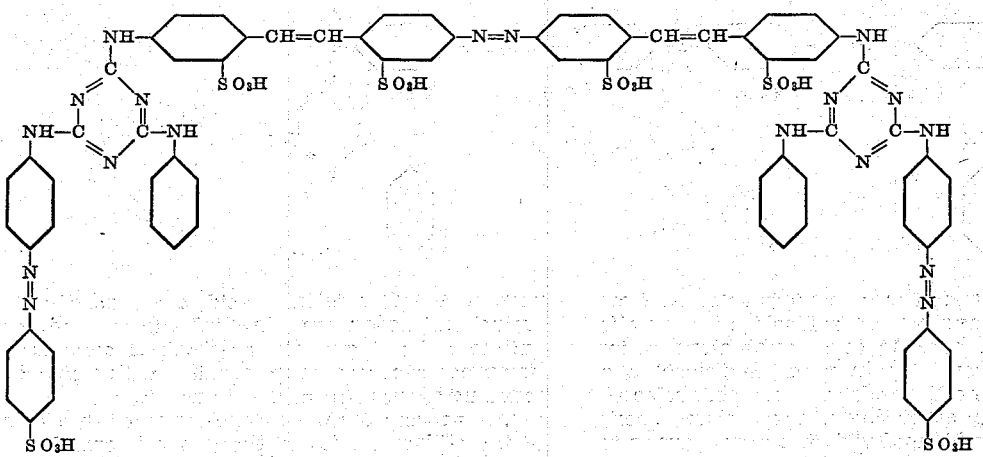

which comprises condensing one mol. of cyanuric chloride with one mol. of 4-nitro-4'-aminostilbene-2:2'-disulfonic acid, one mol. of 4-amino-1:1'-azobenzene-4'-sulfonic acid and one mol. of aniline and reducing the so-obtained condensation product in an alkaline medium with a smooth reducing agent.

6. A process for the manufacture of the stilbene dyestuff of the formula

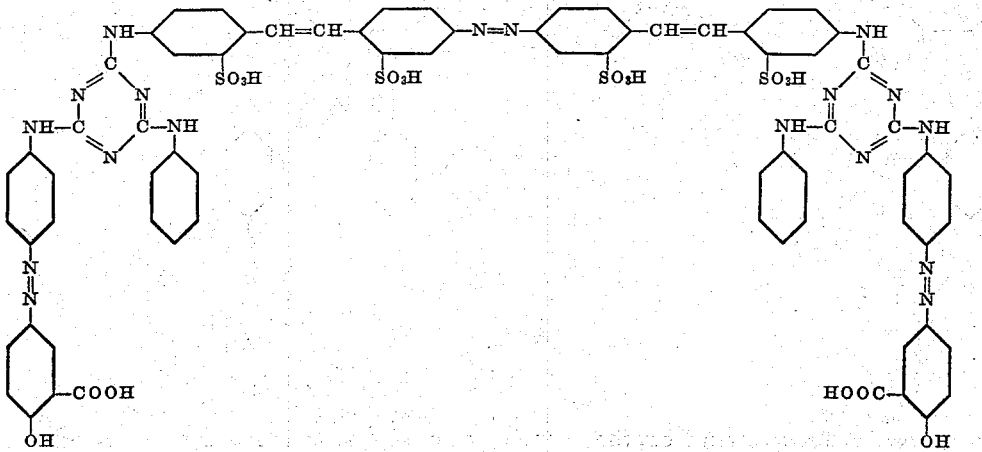

which comprises condensing one mol. of cyanuric chloride with one mol. of 4-nitro-4'-aminostilbene-2:2'-disulfonic acid, one mol. of 4-amino-4'-hydroxy-1 : 1'-azobenzene-3'-carboxylic acid and one mol. of aniline and reducing the so-obtained condensation product in an alkaline medium with a smooth reducing agent.

7. A process for the manufacture of the stilbene dyestuff of the formula

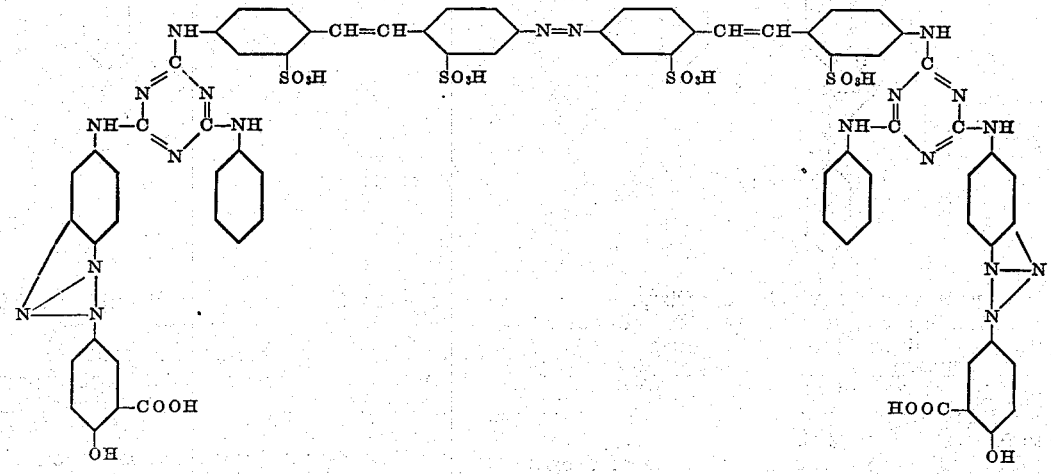

bene-2:2'-disulfonic acid, one mol. of 5-amino-2-(4'-hydroxy-3'-carboxy)-phenyl-1:3-benztriazol and one mol. of aniline and reducing the so-obtained condensation product in an alkaline medium with a smooth reducing agent.

8. The dyestuffs of the stilbene series of the general formula

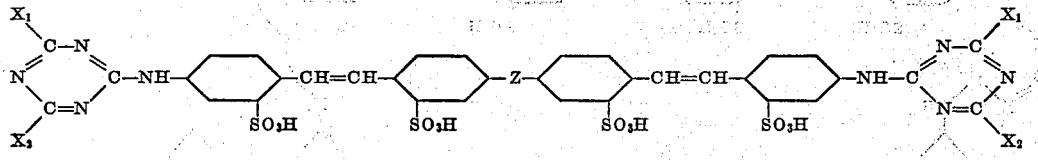

wherein each $X_1$ stands for the same member selected from the group consisting of radicals of aromatic amines of the benzene and naphthalene series and of heterocyclic amines of the thiazol and triazol series, each $X_2$ stands for the same member selected from the group consisting of hydroxy and amino groups and radicals of low molecular aliphatic amines and aromatic amines of the benzene series, the amines in both cases $X_1$ and $X_2$ being bound with the amino group to the cyanuric ring, Z stands for a member selected from the group consisting of the azo and azoxy groups, being orange to brown powders dyeing cellulose fibres in yellow to red shades.

9. The dyestuff of the stilbene series of the formula

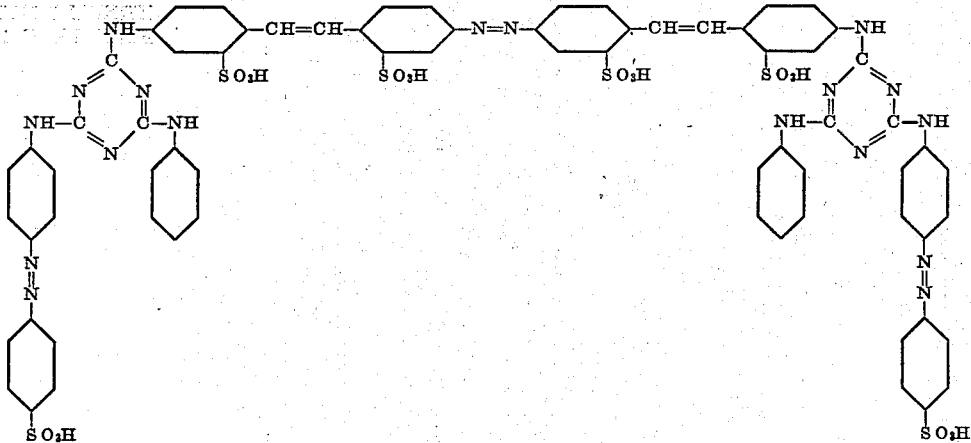

being a brown-orange powder dissolving in water with an orange coloration and dyeing cellulose fibres in light-fast reddish-yellow shades.

10. The dyestuff of the stilbene series of the formula

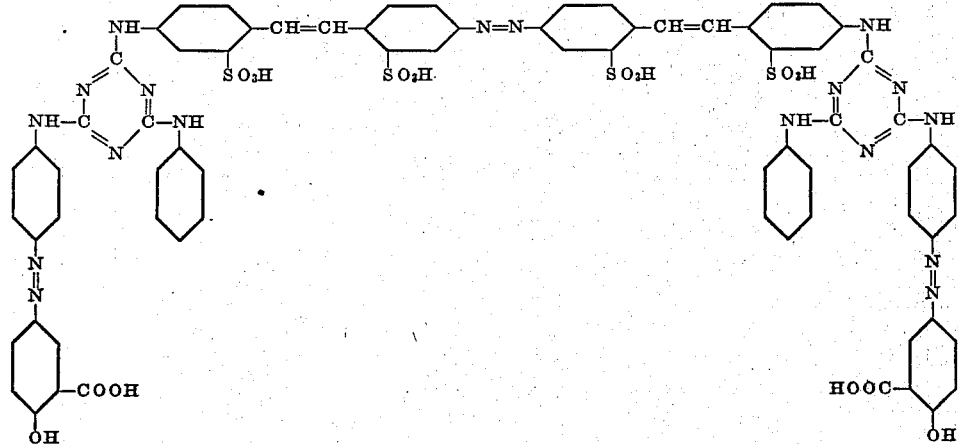

being a brown-orange powder dissolving in water with a yellow coloration and dyeing cellulose fibres in yellow shades.
11. The dyestuff of the stilbene series of the formula
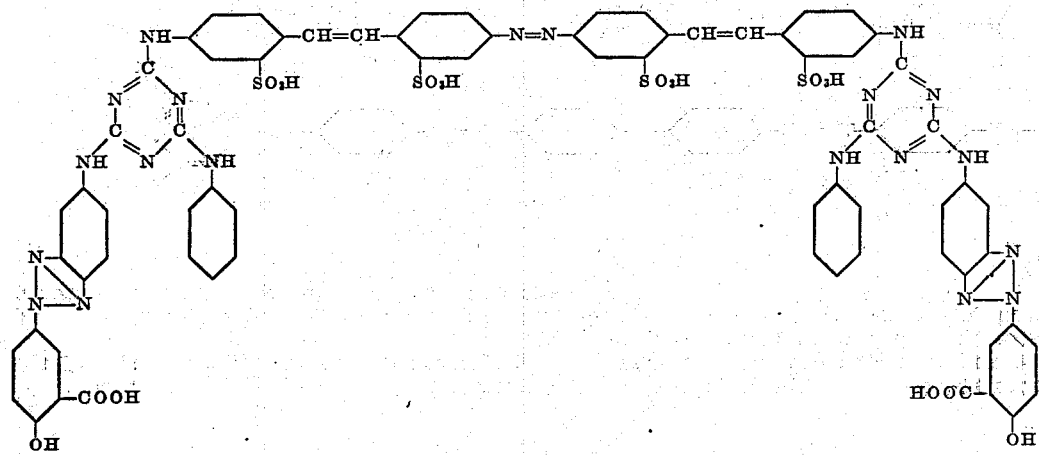
being a brown-orange powder dissolving in water with a yellow-orange coloration and dyeing cellulose fibres in light-fast reddish-yellow shades.
ERNST KELLER.
REINHARD ZWEIDLER.